April 29, 1952 G. H. MOUW 2,595,093
TOOL GRINDING FIXTURE
Filed March 9, 1950 2 SHEETS—SHEET 1
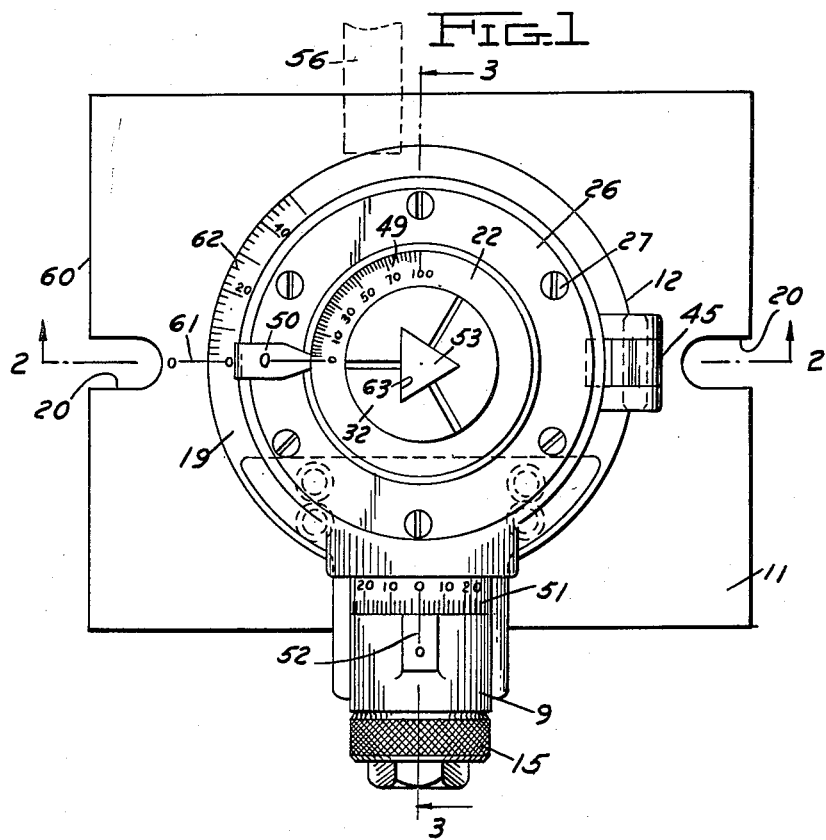
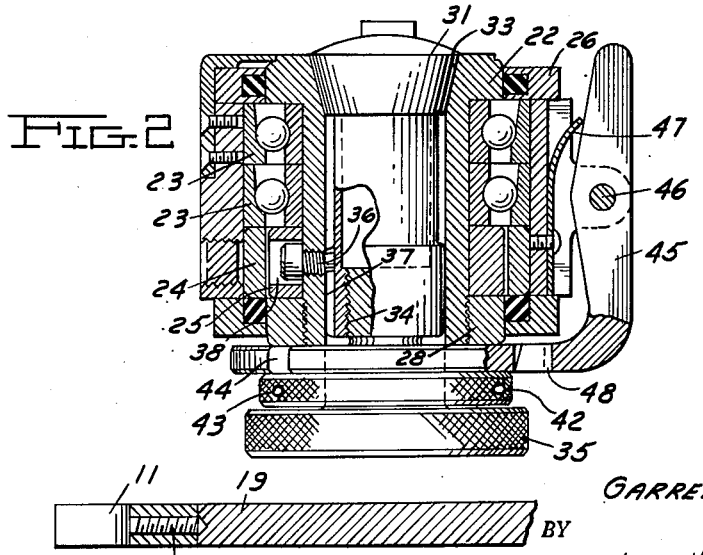
INVENTOR.
GARRETT H. MOUW
BY
Barnes, Kisselle, Laughlin & Raisch
ATTORNEYS

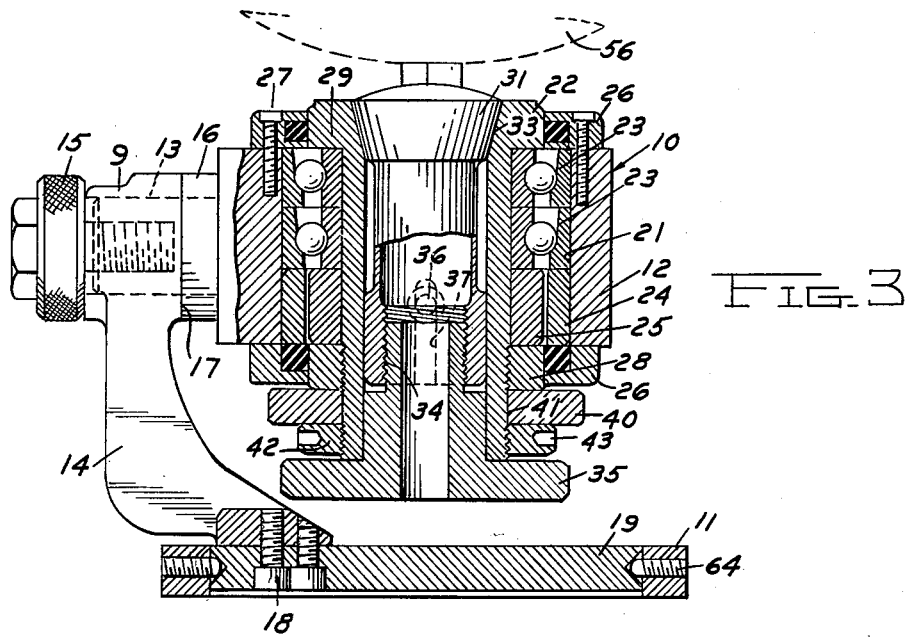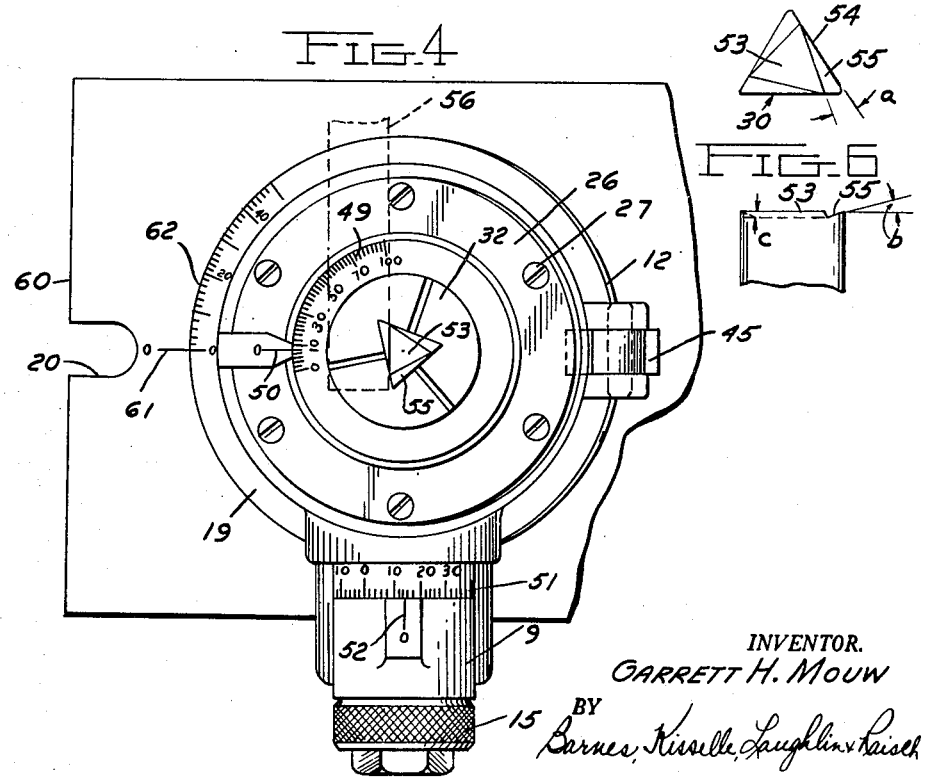

Patented Apr. 29, 1952

2,595,093

UNITED STATES PATENT OFFICE 2,595,093

TOOL GRINDING FIXTURE

Garrett H. Mouw, Royal Oak, Mich.

Application March 9, 1950, Serial No. 148,559

1 Claim. (Cl. 51—220)

1

This invention relates to a grinding fixture and more particularly to a fixture for supporting a cutting tool of the carbide insert type for grinding cutting edges on the faces of the tool.

One of the advantages of using a carbide insert cutting tool resides in the fact that since the tool is provided with a plurality of accurately ground cutting edges which are arranged symmetrically with respect to the axis of the tool, the tool may be removed from its holder and reinserted to present a new cutting edge to the surface being cut which is aligned exactly with the cutting edge previously used. If a plurality of tools are each ground in exactly the same manner so that each cutting edge on the tool corresponds exactly with the other cutting edge on the tool and with the cutting edges on other tools, it will be appreciated that considerable setup time will be saved since the changing or indexing of the tool within its holder will not necessitate a realigning of the cutting edge with the work piece. These advantages however can be utilized only if the cutting edges can be accurately reproduced after they become worn.

It is accordingly an object of this invention to produce a fixture for supporting a cutting tool of the carbide insert type which enables the accurate reproduction of cutting edges on a plurality of faces of the tool and on a plurality of different tools.

It is another object of the invention to produce a grinding fixture adapted to support a tool for grinding and which is constructed so that the tool can be adjusted relative to the grinder so as to produce a cutting edge having a desired variable angular relation with the face of the tool.

Other objects and advantages in the way of construction and operation of the device will become apparent from the following description and drawings in which Figure 1 is a top plan view of the grinding fixture of this invention.

Figure 2 is a sectional view taken along the lines 2—2 in Figure 1.

Figure 3 is a sectional view taken along the lines 3—3 of Figure 1.

Figure 4 is a top plan view of the grinding fixture with the tool mounted thereon and with the head and sleeve locked in a desired position of adjustment.

Figure 5 is a top plan view of a cutting tool of the type adapted to be supported by the fixture of this invention for grinding and showing one form of a chip breaker.

2

Figure 6 is a partial side elevation of the tool shown in Figure 5.

Referring to the drawings the fixture includes a head 10 supported for universal pivoting on base 11. Head 10 comprises a casing 12 having a circular boss 13 at one side thereof which is supported for rotation in a vertical plane within a bearing 9 at the upper end of an arcuate support arm 14. Boss 13 is internally threaded for engagement with a lock screw 15 which when tightened clamps an annular shoulder 16 on casing 12 against an abutting face 17 of bearing 9. At its lower end arm 14 is secured as by socket head screws 18 on a circular base plate 19 which is swivelly mounted on base 11. Base 11 is slotted as at 20 for the reception of clamping bolts which enable clamping the fixture firmly on the table of a grinder.

Casing 12 is provided with an accurately machined bore 21, the axis of which coincides with the swivel axis of swivel plate 19 when the casing 12 is adjusted so that the bore extends perpendicularly to the base of the fixture. A sleeve 22 is mounted for rotation in bore 21 by means of a pair of bearings 23. Within bore 21 there is also positioned a pair of spacer rings 24 and 25. Ring 24 abuts against the outer race of bearings 23 and ring 25 abuts against the inner race of bearings 23. At each end casing 12 is provided with an annular dust seal 26 secured to the casing as by cap screws 27. Sleeve 22 is retained and prevented from axial movement in the bore 21 by means of an annular lock nut 28 which is threadedly engaged over the lower end of the sleeve and which when in the tightened condition clamps spacer 25 against the inner races of bearings 23. The inner race of the upper bearing 23 is thereby clamped against the shoulder 29 at the enlarged upper end of the sleeve. It will be observed that when sleeve 22 is rotated the inner races of bearings 23 and spacer ring 25 rotate with it as a unit.

The cutting tool, generally designated as 30, is supported in sleeve 22 by means of a collet 31. The collet is provided with an opening corresponding in shape with the cross section of tool 30. For the purposes of illustration tool 30 is shown with a triangular cross section but it will be appreciated that the tool may have any cross section desired. The opening in the collet is defined by spaced jaws 32 which are adapted to be contracted by the inwardly tapered wall 33 at the upper end of sleeve 22. At its lower end collet 31 is internally threaded as at 34 for engagement with the threaded end of a draw bar 35 which abuts against the lower end of sleeve 22 so as to contract jaws 32 around the tool when the draw bar is threaded into the lower end of collet 31. A screw 36 extends through the wall of sleeve 22 with its end projecting into the sleeve to form a key which engages in a keyway 37 in collet 31. Collet 31 can therefore be seated in sleeve 22 only by bringing slot 37 into registration with the end of screw 36. Spacer ring 25 is apertured as at 38 to accommodate the head of screw 36.

A circular index plate 40 receives a cylindrical portion 41 adjacent the lower end of sleeve 22. Index plate 40 is rotatably supported by sleeve 22 but is arranged to be clamped against lock nut 28 so as to rotate with the sleeve by means of an additional lock nut 42. Lock nut 42 is formed with a plurality of sockets 43 to accommodate the spanner wrench or like tool. Index plate 40 is provided around its periphery with a plurality of notches 44. A dog 45, pivoted on casing 12 as at 46, is biased by a spring 47 so that its lower hooked end 48 engages in one of the slots 44 of the index plate. The number and spacing of slots 44 on index plate 40 correspond with the number of and the angular relationship between the flat faces of the tool to be ground. If, as is shown in Figures 5 and 6, the tool 30 has the cross section of an equilateral triangle, then the index plate 40 is provided with three notches 44 spaced apart 120°.

The upper end face of sleeve 22 is provided with a series of graduations 49 for visibly indicating the position of the collet with respect to a stationary pointer 50 on casing 12. The annular shoulder 16 of casing 12 is also provided with a series of graduations 51 which cooperate with an indexing line 52 on the upper end of arm 14 for indicating the extent of inclination of the axis of the collet with respect to base 11.

In order to enable mounting the device in a predetermined position on the table of a grinding machine base 11 is provided with suitable indicating means. In the case of a rectangularly shaped base, these means may simply comprise the straight edges 60 of the base together with an indexing line 61 on the base which cooperates with a scale of graduations 62 around the edge of swivel plate 19. Likewise, in order to initially locate one of the cutting edges of the tool in a predetermined position relative to the face of the grinding wheel of the machine on which the device is mounted, screw 36 and keyway 37 are arranged such that when collet 31 is engaged within sleeve 22, one of the flat faces 63 of the triangularly shaped opening in the collet is disposed perpendicularly to and bisected by a diameter through the zero point on scale 49 and the axis of rotation of sleeve 22. The zero mark on scale 62 is aligned with indicating pointer 50 such that when index line 61 and pointer 50 both read zero on their respective scales, the flat face 63 of the opening in the collet is parallel to the indicating edge 60 of base 11 and therefore bears the same relation with the grinding face of the wheel as the edge 60.

For the purposes of illustration the carbide insert tool 30 is shown as having a cross section in the form of an equilateral triangle. Tools of this type having differently shaped cross sections are, however, commonly used. The grinding fixture of this invention is adapted for grinding carbide insert bits of any shape, the only requirement being a collet having an opening conforming in size and shape with the cross section of the tool. A tool of this type is invariably ground so as to present a chip breaker 53 at each end thereof. The chip breaker is usually ground so that each of its side edges forms an angle $a$ with a corresponding side face 54 of the tool and so that the cutting face 55 of the tool forms an angle $b$ with a plane perpendicular to the longitudinal axis of the tool. In the drawings angles $a$ and $b$ are shown in the neighborhood of about 15°. These angles of course may vary on different tools and for different types of work.

The device is mounted on the table of a grinding machine in a manner to align edge 60 of base 11 parallel to the side face of the grinding wheel 56. This may be accomplished by aligning base 11 with the T slots on the table of the machine or by simply setting the base against the conventional stop rail along one of the longitudinal edges of the table. The T slots and stop rail are parallel with the ways on which the table is usually slidably mounted and the grinding wheel may be readily adjusted such that its side faces are parallel to the ways of the machine. When base 11 is properly aligned it is secured to the table by clamping bolts which engage within the T slots in the table and pass upwardly through the slotted portions 20 in base 11. Swivel plate 19 is then rotated to a position where the zero point on scale 62 coincides with the indexing line 61 on base 11 and is locked in this position by tightening set screws 64.

When it is desired to grind the tool shown in Figures 5 and 6 with a chip breaker as shown, an index plate 40 is selected having three equally spaced notches 44. This index plate is loosely fitted on sleeve 22. The tool is inserted within the opening of collet 31 and tightly secured therein by tightening draw bar 35. In order to reproduce the angle $b$ on the cutting face of the tool, casing 12 is tilted on its pivot 13 an amount equal to the angle desired, which will be indicated by the angular graduations 51 with respect to the zero line 52, and locked in this position by means of lock screw 15. The fixture is then set for angle $a$ by rotating the sleeve as shown in Figure 5 to the desired angle $a$ which is indicated by the graduations 49 with respect to the zero line on pointer 50. Then with dog 45 engaged in one of the notches 44 lock nut 42 is tightened while the sleeve is held stationary so as to clamp index plate 40 against lock nut 28. The tool is thus positioned so as to grind the desired cutting edge on one of the tool faces. After the first face has been ground dog 45 is released and the sleeve rotated so that the next succeeding notch 44 in index plate 40 is engaged by dog 45. The tool is thus indexed so that a cutting edge identical with the cutting edge previously ground can be produced. In this manner identical cutting edges can be reproduced on each face of the tool, the cutting edges being symmetrical with respect to the axis of the tool.

It will be noted that when the fixture is adjusted and used in the manner above described, the depth of the chip breaker is constant as indicated at $c$ in Figure 6 because the tool is tilted from the vertical position on an axis parallel to the side face of the grinding wheel. A chip breaker of constant depth is usually desirable for obtaining uniform results in cutting. The chip breaker need not be of constant depth, however, and the cutting face ground may be compounded to a desired angle by rotating swivel plate 19 relative to the indexing line 61 on base 11.

What I claim is:

A fixture for supporting a cutting tool for grinding the cutting edges on a plurality of angularly related longitudinally extending faces on the tool comprising a support, a circular base plate mounted on said support for rotation about the axis of said circular base plate, indicia on said support and said base plate for determining the relative rotative positions of said support and base plate, an arm on said base plate extending upwardly from the plane of said base plate, said arm having at its upper end a bearing member for rotatably supporting a casing for rotation, the axis of said bearing member being parallel to the plane of rotation of said base plate and intersecting the axis of rotation of said base plate, said casing having an axial bore therein, said casing having a bearing portion rotatably supported by the bearing member at the upper end of said arm, said bearing portion of said casing having its axis of rotation intersecting and perpendicularly related to the axis of said axial bore in said casing, said casing and bearing portion being rotatable through 360° on said arm and being dimensioned such that, when the casing is rotated to a position wherein the axis of said axial bore is perpendicular to the plane of rotation of said base plate, said last mentioned axis coincides with the axis of rotation of said base plate, a sleeve rotatably supported within said axial bore, a collet having an opening therein corresponding in shape with the cross section of said tool with the angularly related, longitudinally extending faces, cooperating guide and slot means on said sleeve and collet for fixedly positioning said collet in said sleeve with the collet extending to one end of the sleeve, indicia on said sleeve and said casing for indicating the position of a face of the tool in said collet relative to said casing, an index plate supported on said sleeve adjacent its opposite end for rotation relative to the sleeve, means for coupling said index plate and sleeve for rotation together, means on said casing engageable with the index plate for locking said index plate in a plurality of angularly related positions on said casing, said positions being angularly related to correspond with the angular relation between the faces of the tool to be ground, and a drawbar having a manually engageable portion at said opposite end of said sleeve for locking said collet against axial movement within said sleeve, said arm being dimensioned such that the perpendicular distance between the plane of said base plate and the axis of the bearing member on said arm is greater than the perpendicular distance between said manually engageable portion of said drawbar and the axis of said bearing member at the upper end of said arm.

GARRETT H. MOUW.

REFERENCES CITED

The following references are of record in the file of this patent:

UNITED STATES PATENTS

| Number | Name | Date |
|---|---|---|
| 856,662 | Smith | June 11, 1907 |
| 1,703,017 | Singer | Feb. 19, 1929 |
| 1,783,540 | Hogg et al. | Dec. 2, 1930 |
| 2,214,166 | Hertlein | Sept. 10, 1940 |
| 2,432,058 | Wiken et al. | Dec. 2, 1947 |
| 2,434,600 | Swenson | Jan. 13, 1948 |

FOREIGN PATENTS

| Number | Country | Date |
|---|---|---|
| 164,698 | Great Britain | Mar. 16, 1922 |
| 541,433 | Great Britain | Nov. 26, 1941 |
| 551,060 | Great Britain | Feb. 5, 1943 |